United States Patent [19]

Yamashita et al.

[11] Patent Number: 4,795,239

[45] Date of Patent: Jan. 3, 1989

[54] METHOD OF DRIVING A DISPLAY PANEL

[75] Inventors: Shinichi Yamashita, Atsugi; Hideo Kanno, Kawasaki; Atsushi Mizutome, Kanagawa; Hiroshi Inoue, Yokohama, all of Japan

[73] Assignee: Canon Kabushiki Kaisha, Tokyo, Japan

[21] Appl. No.: 898,482

[22] Filed: Aug. 21, 1986

[30] Foreign Application Priority Data

Aug. 29, 1985 [JP] Japan .................................. 60-188488

[51] Int. Cl.$^4$ ........................... G02F 1/13; G09G 3/36
[52] U.S. Cl. ..................................... 350/333; 350/332; 350/350 S; 340/784
[58] Field of Search .................... 350/332, 333, 350 S; 340/784

[56] References Cited

U.S. PATENT DOCUMENTS

| 4,227,193 | 10/1980 | Shanks ................................ | 340/784 |
| 4,250,503 | 2/1981 | Shanks ................................ | 340/784 |
| 4,393,379 | 7/1983 | Berting et al. ...................... | 340/784 |

FOREIGN PATENT DOCUMENTS

| 0056327 | 3/1986 | Japan .................................... | 340/784 |
| 0181598 | 5/1986 | Japan .................................... | 350/332 |
| 2156567 | 10/1985 | United Kingdom ................. | 340/784 |

Primary Examiner—Stanley D. Miller
Assistant Examiner—Trong Quang Phan
Attorney, Agent, or Firm—Fitzpatrick, Cella, Harper, & Scinto

[57] ABSTRACT

A method of driving a liquid crystal display panel which is suitable to display a multivalue image such as a television image or the like, including the steps of inverting an image signal every time a horizontal sync signal is generated, applying the image signal to source lines of the display panel, and synchronously applying an inversion control signal to the common opposite electrode of the display panel, thereby remarkably reducing the driving voltage of the source lines. In this manner, a high-speed CMOS device of a low withstanding voltage can be used as an integrated circuit to drive the source lines.

14 Claims, 7 Drawing Sheets

METHOD OF DRIVING A DISPLAY PANEL

BACKGROUND OF THE INVENTION

1. Field of the Invention

The present invention relates to a method of driving a display panel having an active matrix base plate and, more particularly, to a method of driving a liquid crystal display panel for displaying a multivalue image such as a television image or the like.

2. Related Background Art

Hitherto, there has been proposed a display panel for displaying a multivalue image, for example, a television image by use of a high density two-dimensional matrix type liquid crystal panel (active matrix type liquid crystal panel) using a thin film transistor (hereinafter, abbreviated to a TFT).

Figure 3:
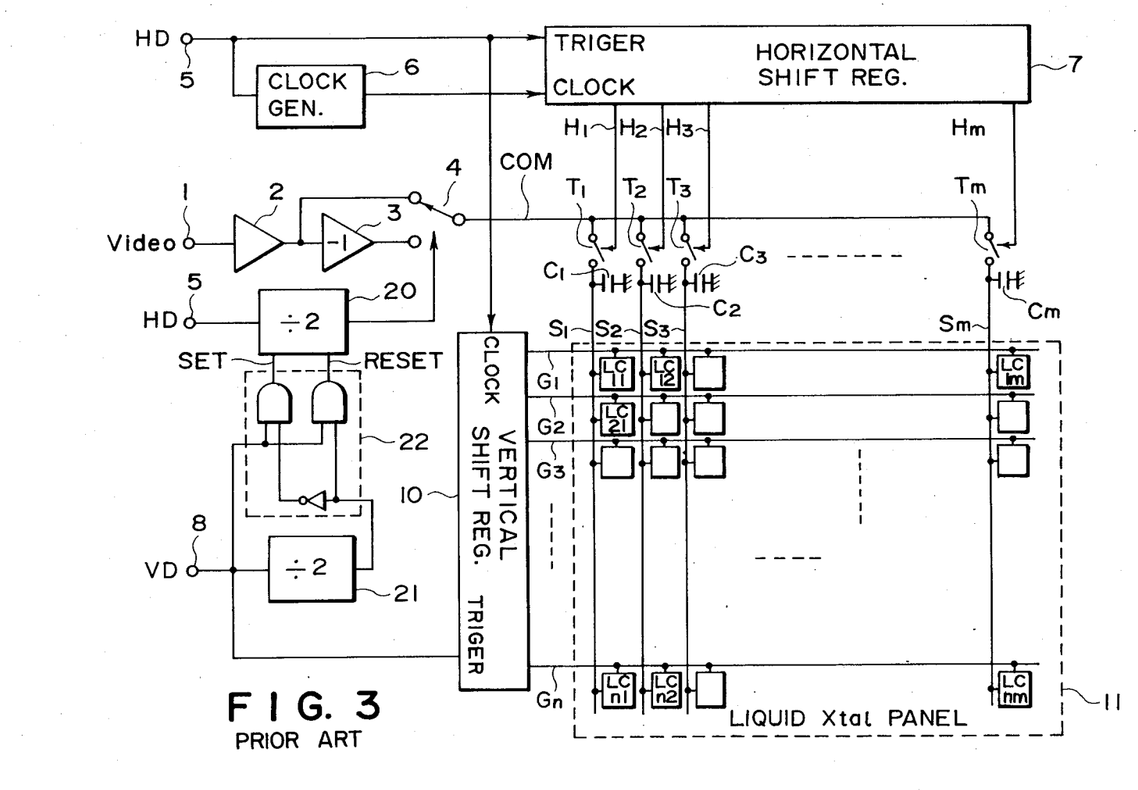
FIG. 3 is a diagram of a conventional driving circuit.

Such a display panel is constituted as shown in, for example, FIG. 3. As a method of driving such a display panel, there has already been proposed a system in which an image signal which is applied to the panel is inverted for the period of integer times, in particular, one time as long as one horizontal scanning period. In FIG. 3, reference numeral 1 denotes an image signal input terminal; 2 is an amplifier to amplify the input image signal; 3 denotes an inverter to invert and amplify the amplified image signal; 4 denotes a switch to change over the outputs of the amplifier 2 and inverter 3 in accordance with the polarity of the signal which is derived by frequency dividing a vertical sync signal, which will be explained hereinafter, by half; $T_1$ to $T_m$ denote switches to distribute the signal switched by the switch 4 to capacitors $C_1$ to $C_m$ by control signals $H_1$ to $H_m$, respectively; $S_1$ to $S_m$ denote source lines of a liquid crystal panel 11 which is connected to the capacitors $C_1$ to $C_m$; $G_1$ to $G_n$ denote gate lines of the liquid crystal panel 11; $LC_{11}$ to $LC_{nm}$ denote pixels of the liquid crystal panel; 5 denotes a horizontal sync signal (HD) input terminal; 6 denotes a clock generator to generate the clock signal which is substantially m times the HD in rate; 7 denotes a horizontal shift register to sequentially generate the scanning pulses $H_1$ to $H_m$ synchronized with the HD in response to the output of the clock generator 6; 8 denotes a vertical sync signal (VD) input terminal; 10 denotes a vertical shift register for shifting at the HD period and for sequencially generating scanning pulses synchronized with the VD; 20 denotes a frequency divider (I) for frequency dividing the HD by half; 21 a frequency divider (II) for frequency dividing the VD by half; and 22 denotes a pulse distributing circuit for generating a pulse to set/reset the frequency divider (I) 20.

Figure 4:
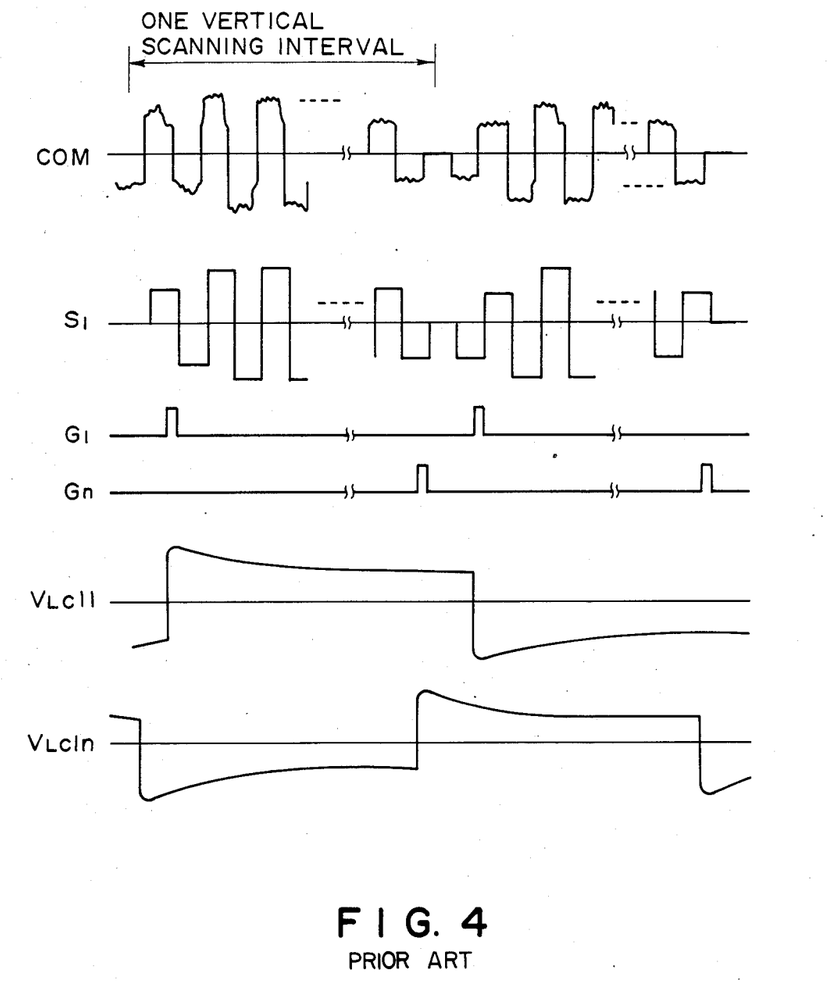
FIG. 4 is a time chart for the operation of the circuit of FIG. 3.

In the foregoing driving circuit, an image signal such as, for example, a television signal is input to the image signal input terminal 1 and amplified by the amplifier 2 to a signal amplitude which is suitable to drive the liquid crystal. The amplified image signal is supplied to the switch 4 and inverter 3. The switch 4 selects the outputs of the amplifier 2 and inverter 3 in accordance with the polarity of the output signal of the frequency divider (I) 20, which will be explained hereinafter, in order to produce the image signal. This switching operation is needed to drive the liquid crystal in an alternate current manner. The image signal is supplied to the common terminals of the switches $T_1$ to $T_m$ and distributed to the capacitors $C_1$ to $C_m$ and to the source lines $S_1$ to $S_m$ connected thereto in response to the control signals $H_1$ to $H_m$. The clock signals which are generated from the clock generator 6, and are substantially m times the horizontal scanning interval, are is supplied to the horizontal shift register 7, and the scan is sequentially performed for one horizontal period by the control signals $H_1$ to $H_m$. By sequentially making the switches $T_1$ to $T_m$ conductive for only one clock period, the image signals respectively corresponding to pixels $LC_{kl}$ to $LC_{km}$ (K=1 to n) in the horizontal direction are sampled and held in the capacitors $C_1$ to $C_m$. One of the gate lines $G_1$ to $G_n$ is turned on during the horizontal blanking period of the image signal, and the signals sampled and held in the capacitors $C_1$ to $C_m$ are transferred to the pixels $LC_{kl}$ to $LC_{km}$ of one line and displayed. The signals such as to sequentially scan the gate lines $G_1$ to $G_n$ within one vertical scanning interval in which the HD is used as the clock are generated from the vertical shift register 10 and applied to the gate lines $G_1$ to $G_n$. FIG. 4 shows a timing chart for this operation.

With the above constitution, a television image is displayed on the liquid crystal panel 11.

As mentioned above, the frequency divider (I) 20 frequency divides the HD by half, and the image signal is controlled by a polarity inverting circuit consisting of the inverter 3 and switch 4. The set/reset signal generated from the frequency divider (II) 21 and pulse distributing circuit 22 is supplied to the divider (I) 20. The set/reset signal is constituted such as to alternately and repeatedly set and reset at every VD period. Therefore, the phase of the output of the divider (I) 20 is inverted at every VD period.

By use of the above-mentioned circuit, the signal whose phase is inverted at every VD can be applied to a COM for the period which is shorter than 1VD and is integer times as long as 1HD.

Figure 5:
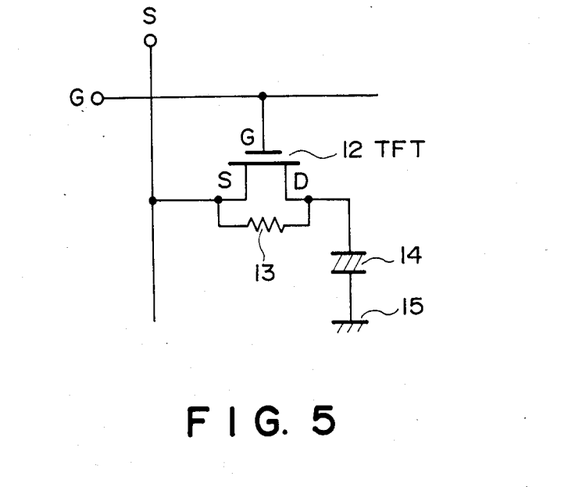
FIGS. 5 and 6 are a diagram and a characteristic graph of a liquid crystal cell, respectively

FIG. 5 is a constitutional diagram showing an example of the pixels $LC_{11}$ to $LC_{nm}$. In FIG. 5, reference numeral 12 denotes a TFT; 13 denotes a leak resistor of a TFT; 14 denotes a liquid crystal cell; and 15 denotes a common opposite electrode (ITO) of the liquid crystal cell. The signal which is obtained by sampling and holding the image signal is supplied as the source signal S of the TFT 12. The vertical scanning signal is supplied to a gate line G. While the gate line G is ON, the source S and drain D of the TFT 12 are made conductive and the voltage of the source line S is applied to the capacitance $C_{LC}$ of the liquid crystal cell 14. Thus, the waveform of the capacitance $C_{LC}$ becomes the AC driving waveforms which are inverted at every vertical period as shown at $V_{LCll}$ and $V_{LCln}$ in FIG. 4.

Figure 6:
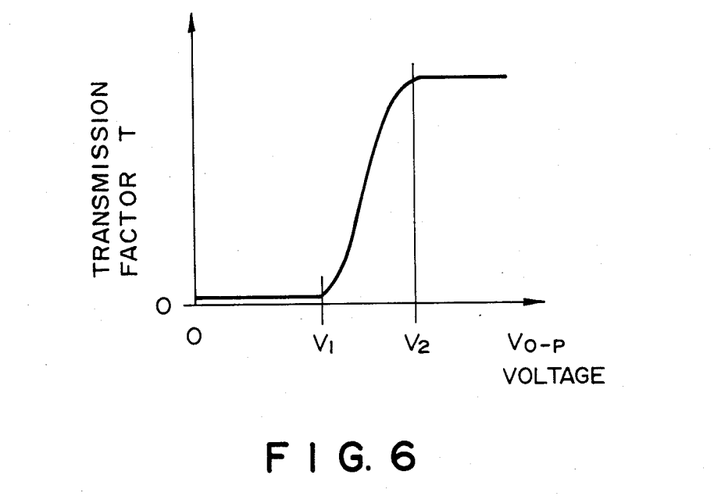

FIG. 6 is a characteristic graph showing the relation between the driving voltage of the liquid crystal and the transmission factor. The abscissa axis indicates the voltage between both terminals of the liquid crystal and the ordinate axis represents the transmission factor of the liquid crystal. In the graph, $V_1$ and $V_2$ denote voltage threshold values at the start and end of the phase transition. In general, the transmission factor of the liquid crystal does not change at voltages within a range of 0 to $V_1$ but changes in correspondence to the voltage within a range of $V_1$ to $V_2$. Therefore, the image signal is supplied at voltages within a range of $V_1$ to $V_2$ and the voltage amplitude of the signal falls within the range of 0 to $V_2$.

According to the above-mentioned conventional method, the voltage value of the signal which is applied to the source line becomes ten-odd volts. However, on the other hand, a CMOS integrated circuit is used as the driving circuit of the source line in order to reduce the electric power comsumption. The CMOS integrated circuit can operate at a voltage of tenodd volts and its operating speed is limited to 2 to 3 MHz. Therefore, in the case of driving the display panel of a high fine pitch, for example, 640×400 pixels at a driving frequency of about 12 MHz, the driving circuit cannot be realized as a CMOS-IC.

SUMMARY OF THE INVENTION

The present invention is made in consideration of the foregoing points and it is an object of the invention to provide a method of driving a liquid crystal display panel in which the operating voltage of a signal processing IC is reduced and a high-speed integrated circuit can be used and a display panel of high density can be constituted.

According to the present invention, there is provided a method of driving a liquid crystal display panel of an active matrix type using source lines and gate lines, whereby the plurality of an inversion control every time a horizontal sync signal is used, on the input side of the source lines and a common opposite electrode is driven synchronously with the inversion control signal.

DETAILED DESCRIPTION OF PREFERRED EMBODIMENTS

According to the present invention, the plurality of an image signal is inverted is every time a horizontal sync signal is applied on the input side of the source line. A square pulse which is the inversion control signal is amplified and supplied to a common opposite electrode. Thus, the voltage which is applied to a liquid crystal becomes the difference between the voltage of the common opposite electrode and the source voltage, thereby making it possible to control by the amplification factor of the square pulse. Namely, the voltage of the source line can be also suppressed to a low level. Therefore, a CMOS-IC can be also used.

An embodiment of the present invention will now be described in detail hereinbelow.

Figure 1:
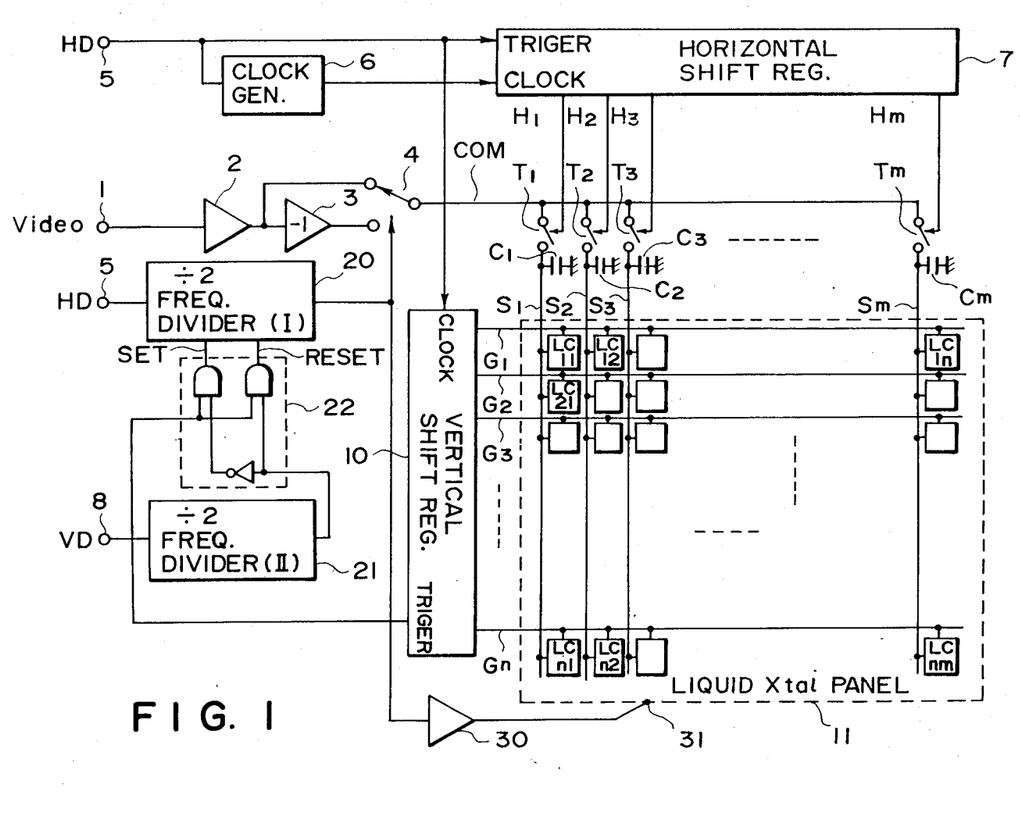
FIG. 1 is a diagram of an embodiment of a driving circuit according to the present invention.
Figure 2:
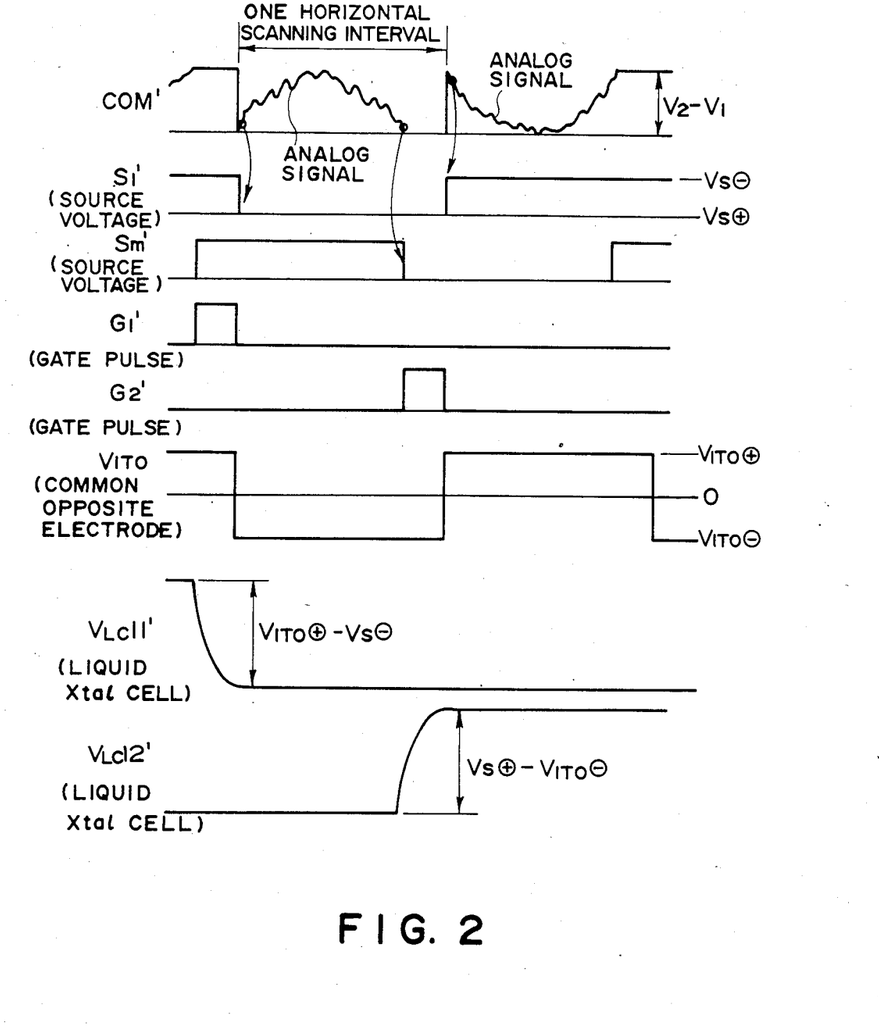
FIG. 2 is a time chart for the operation of the circuit of FIG. 1.

FIG. 1 is a constitutional diagram showing an example of a driving circuit of a liquid crystal display panel as an embodiment of the present invention. In FIG. 1, reference numeral 1 denotes the image signal input terminal; 2 is the amplifier; 3 denotes the inverter; 4 denotes the change-over switch; 5 denotes the input terminal of the horizontal sync signal (HD); 6 denotes the clock generator; 7 denotes the horizontal shift register; 8 denotes the input terminal of the vertical sync signal (VD); 10 denotes the vertical shift register; 11 denotes the liquid crystal panel; 20 denotes the frequency divider (I); 21 denotes the frequency divider (II); and 22 denotes the pulse distributing circuit which has the same function as the conventional driving circuit shown in FIG. 3 and is constituted substantially in the same manner as that shown in FIG. 3. In this embodiment, in addition to the above components, an amplifier 30 to drive the common opposite electrode of the liquid crystal panel 11 is also provided and is connected between the output terminal of the frequency divider (I) 20 and an input terminal 31 of the common opposite electrode (ITO). FIG. 2 is a time chart for explaining the operation of the above embodiment.

In FIG. 1, the image signal to which no bias voltage is added is input to the input terminal 1. The value of a COM signal is set to fall within a range from the threshold value voltage $V_1$ to the saturation voltage $V_2$ shown in FIG. 6 as indicated at COM' in FIG. 2. On the other hand, the inversion control signal to control the switch 4, namely, the square pulse which is derived by frequency dividing the horizontal sync signal is input to the amplifier 30. After the amplitude of this signal is properly adjusted by the amplifier 30, it is applied to the input terminal 31 of the common opposite electrode. This signal is shown at $V_{ITO}$ in FIG. 2. The voltage which is applied to the liquid crystal cell is the voltage between the source line and the ITO when the TFT 12 is turned on as described in FIG. 5. Thus, $V_{LC}$ is equal to $V_{ITO} - V_S$ in FIG. 2.

By setting $V_{ITO} = \pm \frac{1}{2}(V_2 + V_1)$, it is possible to perform the driving operation which is equivalent to that in the conventional example.

In the actual conditions of such a circuit, a capacitance exists between the source line and the ITO, so that the component of $V_{ITO}$ which is applied to the liquid crystal cell attenuates. However, no problem will occur if $V_{ITO}$ is previously set to a slightly higher value in consideration of the amount of attenuation.

In addition, since a capacitance also exists between the gate and drain of the TFT, other waveforms are also overlapped to the waveform of $V_{ITO}$. However, no problem will occur if the inversion is performed at a period of a high frequency of about the horizontal period.

According to the above driving method, the image signal COM falls within a range of a few volts. Therefore, a high-speed CMOS device of, for example, a withstanding voltage of seven volts and a frequency of about 20 to 30 MHz can be used, so that the display panel of a high fine pitch can be realized. Such a high-speed CMOS device can be obviously more highly integrated than the conventional CMOS device, there is also the advantage such that the IC costs can be reduced.

In the above embodiment, the invention is applied to the constitution to directly drive the source lines of the liquid crystal panel. However, the invention can be also applied to the type in which the source lines are classified into blocks by use of TFTs and multiplexed, thereby reducing the number of source take-out lines.

Figure 7:
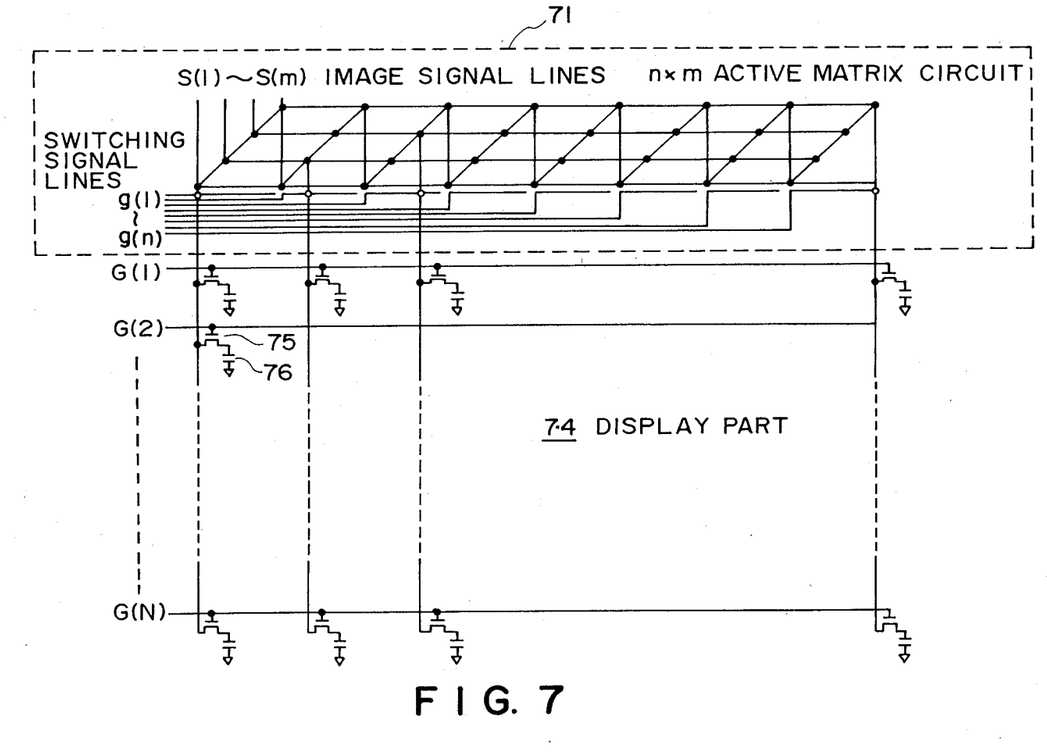
FIG. 7 is an explanatory diagram showing an embodiment of another active matrix (N×M pixels) type display panel of the invention.
Figure 8:
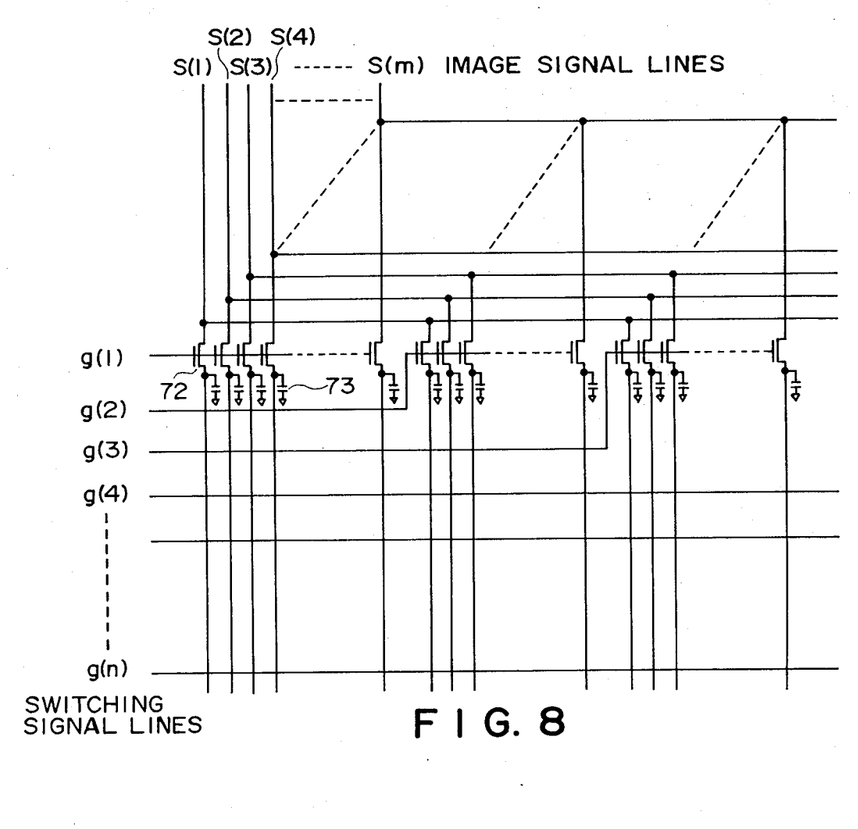
FIG. 8 is a partial enlarged diagram of M active matrix arrangements of n×m matrix wirings which are used in the present invention.

Such an example is shown in FIGS. 7 and 8. FIG. 7 illustrates a whole diagram of a liquid crystal display apparatus of the N×M active matrix type in which switching elements are arranged for every N×M pixels shown in FIG. 1 and an n×m active matrix circuit 71 shown by a section surrounded by a broken line which is arranged on the same substrate as that LCD apparatus. FIG. 8 shows an internal arrangement of the n x m active matrix circuit 71 in FIG. 7. In FIG. 8, numeral 72 denotes an analog switching transistor for the image signal (hereinafter, abbreviated as an A.S. transistor); 7-3 is a capacitor to sample and hold the image signal; S(1) to S(m) denote image signal lines latched to the A.S. transistors 72; and g(1) to g(n) denote signal lines to switch the A.S. transistors 72. When the M signal lines in FIG. 1 are now arranged so as to become the matrix wirings which are constituted into m common lines, it is possible to constitute a matrix circuit comprising the signal lines S(1) to S(m) and signal lines g(1) to g(n) in FIG. 8 and the (n×m) A.S. transistors 72 and capacitors 73. n is an integer of 1 or larger and n is equal to or larger than M/m.

As described above, according to the present invention, by driving the common opposite electrode synchronously with the inversion control signal of the image signal, the source signal driving voltage can be remarkably reduced. The high-speed CMOS device of a low withstanding voltage can be used as the integrated circuit to drive the source lines. The driving frequency can be raised, namely, the display panel of a high fine pitch can be realized.

What is claimed is:

1. A method of driving a display panel of an active matrix type using source lines and gate lines, and an opposite common electrode common to said panel and opposite thereto, comprising the steps of:
   generating an inversion control signal which is inverted every time a horizontal sync signal is applied on the input side of the source line; and
   driving the common opposite electrode synchronously with said inversion control signal.

2. A driving method according to claim 1, further comprising the step of generating and applying an image signal to the input side of the source line, wherein said image signal is inverted a plurality of times, wherein the period of each inverted portion of said image signal is substantially the same as the period of the horizontal sync signal.

3. A driving method according to claim 1, wherein said source lines are connected to a circuit having matrix wirings which are constituted by n switching signal lines and m image signal lines.

4. A driving method according to claim 3, wherein said circuit has analog switching transistors, wherein said method further comprises the step of applying an image signal to said analog switching transistors.

5. A driving method according to claim 3, wherein said circuit has a sample and hold circuit, wherein said method further comprises the step of sampling and holding an image signal with the sample and hold circuit.

6. A driving method according to claim 5, wherein said sample and hold circuit has a capacitor for sampling and holding, wherein said sampling and holding step comprises the step of sampling and holding the image signal with the capacitor.

7. A driving method according to claim 1, wherein said source and gate lines are respectively connected to the source and gate of a thin film transistor.

8. A driving method according to claim 7, wherein said thin film transistor comprises an amorphous silicon semiconductor.

9. A liquid crystal display device comprising:
   a liquid crystal panel including:
      a plurality of liquid crystal pixels arranged in rows and columns;
      a plurality of thin-film transistors respectively connected to said plurality of liquid crystal pixels;
      a plurality of gate lines, each commonly connected to the gates of the thin-film transistors for every row;
      a plurality of source lines, each commonly connected to the sources of the thin-film transistors for every column; and
      common opposite electrodes for commonly connecting said plurality of liquid crystal pixels;
   means for applying a scanning pulse to said plurality of gate lines for every vertical scanning interval;
   means for applying an image signal to said plurality of source lines for every horizontal scanning interval; and
   means for reversing the polarity of a voltage applied to said common opposite electrodes for every horizontal scanning interval.

10. A liquid crystal display device according to claim 9, further comprising a circuit matrix wiring circuit including n switching signal lines and m image signal lines connected to said plurality of source lines.

11. A liquid crystal display device according to claim 10, wherein said circuit includes an image signal analog switching transistor.

12. A liquid crystal display device according to claim 10, wherein said circuit includes a sample-hold circuit.

13. A liquid crystal display device according to claim 9, wherein said thin-film transistor includes a thin-film semiconductor element.

14. A liquid crystal display device according to claim 13, wherein said thin-film semiconductor element is an amorphous silicon film.

* * * * *

UNITED STATES PATENT AND TRADEMARK OFFICE
CERTIFICATE OF CORRECTION

PATENT NO. : 4,795,239

DATED : January 3, 1989

INVENTOR(S) : Yamashita, et al.

It is certified that error appears in the above-identified patent and that said Letters Patent is hereby corrected as shown below:

COLUMN 5

Line 4, "7-3" should read --73--.

Signed and Sealed this

Twentieth Day of February, 1990

Attest:

JEFFREY M. SAMUELS

Attesting Officer      Acting Commissioner of Patents and Trademarks